(12) United States Patent
Radbourne et al.

(10) Patent No.: US 6,398,100 B1
(45) Date of Patent: Jun. 4, 2002

(54) BACK-UP CLAMP

(76) Inventors: Kevin Alan Radbourne, Cinquefoil, Bidford Road, Ardens Grafton, B49 6DP; Zdzislaw Leon Drewnicki, 115 Knights Lane, Tiddington, Stratford. u. A., CV37 7BZ; John Simon Eastham, 2 Stretton Close, Stretton on Fosse, Moreton in Marsh, GL56 9QZ; Keith Vickery, 122 Evesham Road, Stratford upon Avon, CV37 9BH, all of (GB)

( * ) Notice: Subject to any disclaimer, the term of this patent is extended or adjusted under 35 U.S.C. 154(b) by 0 days.

(21) Appl. No.: 09/560,747

(22) Filed: Apr. 28, 2000

(30) Foreign Application Priority Data

Feb. 12, 2000 (GB) ................................. 0003145

(51) Int. Cl.⁷ .................. B23K 37/053; B23K 1/18; B23K 9/02
(52) U.S. Cl. .................. 228/44.5; 228/49.3; 228/50; 228/212; 228/216
(58) Field of Search ................ 228/212, 213, 228/216, 44.3, 44.5, 46, 49.3, 50

(56) References Cited

U.S. PATENT DOCUMENTS

| | | | |
|---|---|---|---|
| 2,780,194 A | | 2/1957 | Croswell ................ 113/103 |
| 3,825,165 A | * | 7/1974 | Howell |
| 4,140,262 A | * | 2/1979 | Wilson et al. |
| 4,177,914 A | | 12/1979 | Clavin ...................... 228/49 B |
| 4,483,477 A | * | 11/1984 | Eckold et al. |
| 4,582,241 A | * | 4/1986 | Johnson |
| 4,875,615 A | * | 10/1989 | Savard |
| 5,110,031 A | | 5/1992 | Rinaldi ........................ 228/50 |
| 5,435,479 A | * | 7/1995 | Puzey et al. |
| 5,535,938 A | * | 7/1996 | Leduc |
| 5,597,108 A | * | 1/1997 | Dierlam |
| 5,816,475 A | * | 10/1998 | Brookhouse |
| 6,119,916 A | * | 9/2000 | Anderson et al. |

FOREIGN PATENT DOCUMENTS

| | | | |
|---|---|---|---|
| EP | 0 193 812 | 9/1986 | ........... B23K/37/04 |
| GB | 1 528 775 | 10/1978 | ........... B23K/37/06 |
| GB | 2 067 945 | 8/1981 | ........... B23K/37/06 |
| GB | 2156468 A | * 10/1995 | |
| WO | WO 95/21721 | 8/1995 | ......... B23K/37/053 |

* cited by examiner

Primary Examiner—Tom Dunn
Assistant Examiner—Kiley Stoner
(74) Attorney, Agent, or Firm—Ken J. Pedersen; Barbara S. Pedersen

(57) ABSTRACT

A back-up clamp suitable for backing up a weld to be formed between adjacent pipe lengths in a pipeline, the clamp having a rigid clamp body, at least one set of clamping members mounted upon the clamp body, a set of back-up shoes mounted upon the clamp body, the set of clamping members and the set of back-up shoes being movable relative to the body, movement of the set of clamping members and the set of back-up shoes being controlled by fluid pressure applied to at least one location of the clamp, the clamp having a number of conduits adapted to deliver pressurised fluid to the location(s), all of each conduit being located within the body. The invention permits the provision of a back-up clamp which requires no flexible or external fluid hoses, and permits the manufacture of a back-up clamp suitable for use with small-diameter pipelines.

15 Claims, 4 Drawing Sheets

BACK-UP CLAMP

FIELD OF THE INVENTION

This invention relates to a back-up clamp for use in the welding of pipelines.

BACKGROUND TO THE INVENTION

Pipelines are in widespread use for the transportation of fluids such as water, gas and oil. Many such pipelines are of metal and are manufactured in lengths which must be assembled on site into the complete pipeline. To connect two adjacent lengths of pipe together it is usual to provide a welded joint. Thus, a new length of pipe is placed close to the end of the existing pipeline and a welded joint is formed therebetween (it is usual for a small gap to be present between the adjacent pipe ends prior to welding, which gap is filled by the weld). A subsequent length of pipe is then placed against the new end of the (extended) pipeline, and the procedure is repeated.

To ensure an accurate and effective weld it is necessary that the two adjacent pipe ends be maintained in alignment during welding. In addition, a known concern with such welded joints is that weld material can be spattered through the gap and into the interior of the pipe, and can impair the subsequent flow of fluid therealong. It is therefore known to insert a back-up clamp into the pipeline adjacent the joint to be welded, the clamp serving to align the two pipe ends and also having a number of shoes which can be moved to lie beneath the gap and prevent any weld spatter from entering into the pipeline. Copper has been found to be a preferred material for the shoes, and in particular copper "101".

DESCRIPTION OF THE PRIOR ART

A back-up clamp of this type is disclosed in WO 95/21721. The back-up clamp comprises two sets of clamping members which are adapted to engage the respective pipes adjacent their ends and to assist the alignment of the pipe ends. Between the clamping members is a ring of copper shoes which is adapted to lie underneath the gap during welding. The clamping members and the copper shoes are movable between a retracted condition in which the back-up clamp can be moved along the pipeline, and an extended condition in which the clamping members and the copper shoes engage the inside surface of the respective pipes, the copper shoes lying immediately beneath the gap. G.B. Patent Application 2,067,945, U.S. Pat. No. 2,780,194, U.S. Pat. No. 4,177,914, U.S. Pat. No. 5,110,031 and European patent application 0 193 812 also disclose back-up clamps of the general type described.

The pipelines which require welding may have a diameter ranging from around six inches (15 cm) to around sixty inches (150 cm), with the back-up clamps having diameters corresponding to slightly less than the diameter of the pipeline. The devices described in the above patents and applications are suited for use with larger diameter pipelines.

The means for actuating the known back-up clamps, i.e. for moving the clamping members and the back-up shoes, is typically by way of hydraulic or pneumatic fluid, which fluid is delivered to the device along the pipeline by a series of flexible hoses. The clamp itself will typically carry a large number of flexible hoses, each end of the hoses being connected to respective parts of the clamp, so that the hose can communicate pneumatic or hydraulic fluid from one location on the clamp to another location on the clamp. For example, if as is typical the back-up clamp has a set of clamping members to either side of the back-up shoes it is necessary to transmit pressurised fluid past the back-up shoes to the actuating means for the set of clamping members remote from the end of the pipeline. Since the back-up shoes engage the pipeline around its full circumference it is not possible to pass the fluid around the back-up shoes, and the fluid must instead pass between those shoes.

It is known to provide a rigid tube upon the clamp which tube passes between adjacent back-up shoes and carries one or more conduits for pressurised fluid; at each end of the tube the conduits terminate in connectors, and flexible hoses are connected to the respective connectors to communicate the fluid to the actuating means for the clamping members. Clearly, in more complex clamps, a greater number conduits may be required within the tube, and a greater number of flexible hoses required for connection thereto. In one known design, the tube can contain six conduits, for example.

Typically therefore, back-up clamps of the types described in the prior art documents listed above require a number of flexible hoses to either side of the back-up shoes. With clamps for larger-diameter pipelines there is usually enough space to accommodate the hoses and their connections to the clamp, but this becomes increasingly difficult to achieve as the diameter of the pipeline, and thus the diameter of the clamp, becomes smaller. Thus, notwithstanding that the hoses can be reduced in cross-sectional size as the clamp becomes smaller, the requirement to connect the hoses to chosen locations on the clamp, and for the hoses to pass around and between other components of the clamp, provides a physical limitation on the smallest diameter which can be provided for, and this smallest diameter is around eight inches (20 cm).

Such clamps are therefore not suited for use on the many piplines having diameters smaller than around eight inches. In addition, the provision of flexible hoses has a number of specific disadvantages.

Firstly, great care has to be taken, both during use of the clamp and also during on-site and off-site handling, to ensure that no damage is caused to any of the hoses. If any damage is caused to a hose, this might not become apparent until the clamp is in use, perhaps preventing one set of the clamping members from operating for example; this will result in considerable wastage of time whilst the clamp is retrieved from within the pipeline, and repaired.

Secondly, the repair of a damaged hose requires a replacement hose to be available, and this might not always be the case on site.

Thirdly, the requirement that a hose may need to be replaced on site requires the hose connections to be releasable, and typically threaded connections are used. Cheaper, permanent, connections cannot be used. In addition, the hose connections must all be made in positions which are accessible to a spanner or other tool, which positions might not be ideal for clamp operation. The result is that the clamp is more complex, and expensive, to manufacture than would be the case if permanent connections could be provided.

Fourthly, it is necessary that the hoses be correctly connected so that the fluid is communicated to the correct location of the clamp. Typically the hoses will be connected in the factory where the clamp is manufactured, but in the event that a user has to replace two or more hoses at the same time, great care must be taken to ensure the correct connections.

SUMMARY OF THE INVENTION

It is an object of the present invention to provide a back-up clamp which avoids or reduces the disadvantages with the prior art clamps.

According to the invention therefore, there is provided a back-up clamp comprising at least one set of clamping members and a set of back-up shoes, the set of clamping members and back-up shoes being operable by fluid pressure, characterised in that the conduits for transmission of fluid pressure are all located within the body of the clamp.

With the present invention therefore, the clamp itself requires no flexible hoses. The advantages of the invention will be apparent, namely that the specific disadvantages of flexible hoses can be avoided. In addition, however, the physical limitation on the smallest diameter of the clamp is removed, so that a back-up clamp according to the invention can be used on smaller pipelines, for example six inch (15 cm) diameter pipelines, so increasing the utility of back-up clamps for pipelines on which they might otherwise not be suitable. However, notwithstanding the advantages of the invention in providing a smaller-diameter clamp than was previously possible, the invention can be utilised for the largest diameter pipelines, where the avoidance of flexible hoses is a considerable advantage.

Preferably, one end of the back-up clamp has a number of connectors, each connector being adapted to cooperate with a connector on the end of a fluid pressure hose. Thus, notwithstanding that the clamp itself requires no flexible hoses, it is still likely that the hydraulic or pneumatic fluid will be delivered to the clamp by way of such hoses. The advantage of this feature, however, is that all of the hoses can be connected to one end of the clamp, and connection of the hoses is a relatively quick and simple task, unencumbered by surrounding clamp componentry. None of the fitted hoses is required to pass around or between any of the clamp componentry.

Preferably, the back-up clamp has two sets of clamping members, one located to either side of the back-up shoes.

Preferably, the back-up clamp includes a pair of flexible bladder means adapted to engage the inside of the pipeline and to provide an air-tight seal therewith. With such embodiments, the volume around the weld-site can be filled with an inert gas such as argon, which is required for the effective welding of certain materials such as stainless steel.

Desirably, the back-up clamp includes a through-bore between its opposed ends. The through-bore permits the equalisation of pressure between the opposed ends of the clamp, and so reduces the likelihood of forced movement of the back-up clamp which might otherwise occur in the presence of a large pressure differential to either side of the clamp. Large pressure differentials are known to be caused for example when pipelines are laid by ship, movement of the ship relative to the laid pipeline compressing (or stretching) the pipeline to one side of the clamp and changing the pressure of the air therewithin. Significant changes in pressure to one side only of the clamp can force the clamp along the pipeline, out of its required position.

Preferably, the back-up clamp is made up in sections, the sections having conduit(s) formed therethrough to permit the passage of fluid. Each section can have a number of conduits which are substantially aligned with the longitudinal axis of the clamp (and so serve to communicate fluid pressure to the next section).

Desirably, some of the sections can have a number of passageways which can communicate fluid pressure from one radial position to a different radial position (so that the conduit can communicate fluid pressure to an actuating cylinder for example).

Accordingly, it is preferred that the pressurised fluid pass along conduits within the clamp at a chosen radius, and only deviate from that radius at the position along the clamp at which fluid within that conduit is required to undertake work such as drive a piston.

Desirably, the clamping members and the back-up shoes are independently actuated. Desirably, each is actuated by its own piston and cylinder arrangement. Usefully, each piston and cylinder arrangement actuates the respective clamping members or back-up shoes by way of a respective toggle mechanism.

Desirably, the piston of each piston and cylinder arrangement can move longitudinally relative to the clamp, the toggle mechanism converting the longitudinal movement of the piston into radial movement of the clamping members or back-up shoes, as the case may be.

Alternatively, at least the back-up shoes are actuated by radially-acting pistons, the clamp having means to communicate fluid pressure to drive the pistons radially outwardly. Desirably, separate means are provided to communicate fluid pressure to drive the pistons radially inwardly also.

BRIEF DESCRIPTION OF THE DRAWINGS

The invention will now be described, by way of example, with reference to the accompanying drawings, in which.

DESCRIPTION OF THE EXEMPLARY EMBODIMENTS

The back-up clamp comprises a first set of clamping members 12, a second set of clamping members 14, and a set of back-up shoes 16. The clamping members 12,14 and shoes 16 are all mounted to a rigid body 20.

Figure 1:
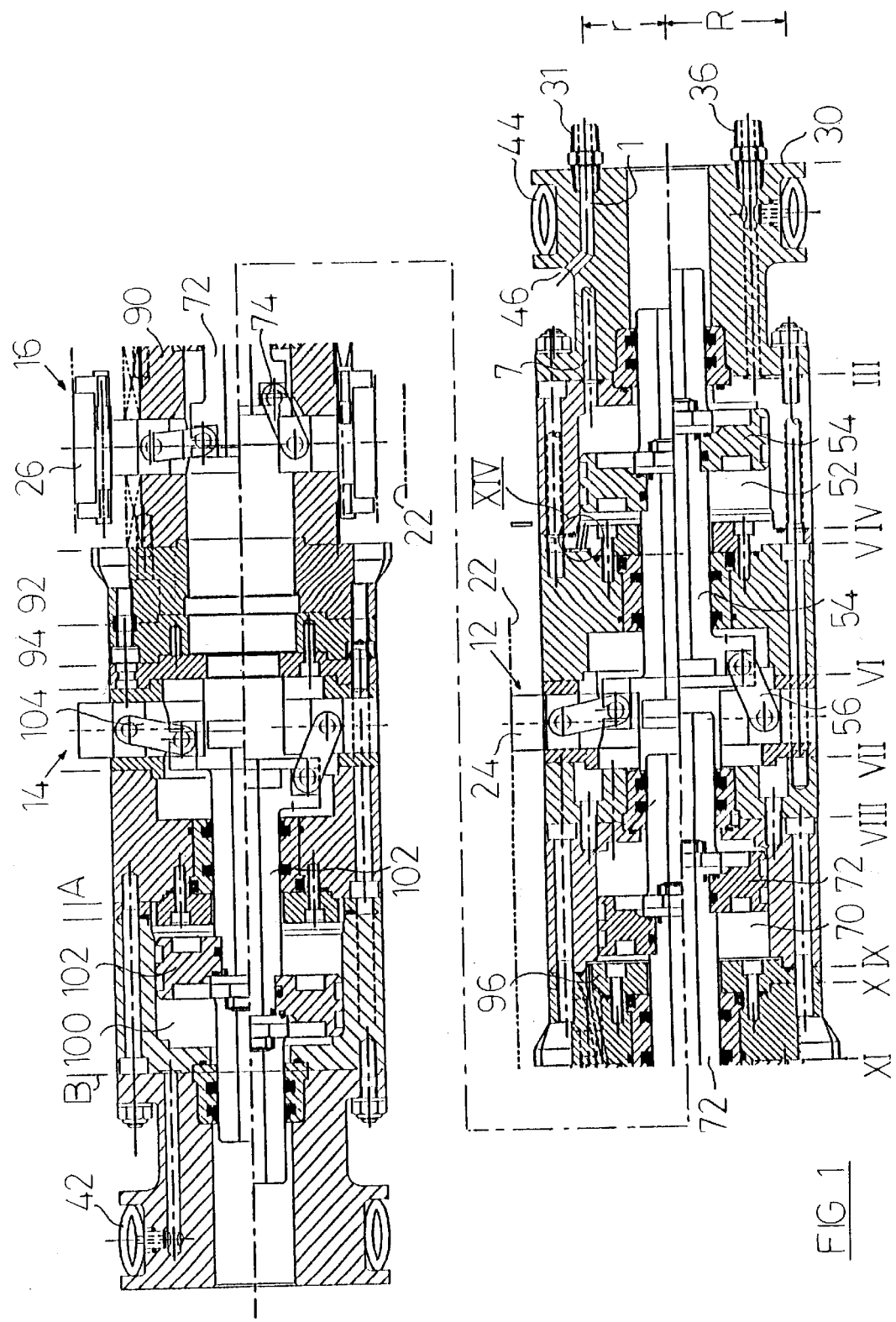
FIG. 1 shows a split-sectional view of a back-up clamp according to the invention.

FIG. 1 is in two parts, the top part showing the left-hand end of the back-up clamp, the bottom part showing the right-hand end of the clamp. FIG. 1 is also a split-sectional view, the top half of each part of the drawing showing the clamping members and back-up shoes extended (so as to engage the inside surface 22 of the pipeline shown in dotted outline), the bottom half of each part of the drawing showing these components retracted (in which condition the back-up clamp may be moved along the pipeline).

Neither the individual clamping members 24 nor the individual back-up shoes 26 are shown in detail since these components do not form a part of the present invention. Nevertheless, in the embodiment shown there are three clamping members 24 in each set 14,16 (see also FIG. 12), and there are six back-up shoes 26 in the set 16 (see also FIG. 13).

Figure 2:
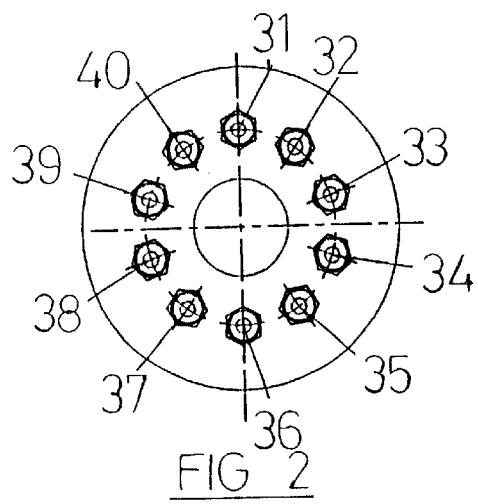
FIG. 2 shows an end view of the back-up clamp.

It will be seen from FIG. 2 that attached to the end 30 of the body 20 there are ten connectors 31,32,33,34,35,36, 37,38,39 and 40, each adapted to cooperate with a connector fitted to the end of a respective hose (not shown). The connectors 31–40 are all identical, and are of known form, comprising a threaded stud which can receive a correspondingly threaded nut attached to the end of a conventional high-pressure hose. Each hose can deliver air to the clamp (if the clamp is pneumatically operated), or hydraulic fluid (if the clamp is hydraulically operated). In addition, the fluid delivered by some of the hoses can be different to the fluid delivered by other hoses—for example, in the embodiment shown one of the hoses delivers an inert gas (such as argon), which is used in certain applications to expel air from adjacent the weld site.

The clamp body 20 can therefore be connected to ten separate hoses, the fluid supplied by each hose fulfilling a different operation. In the embodiment shown the connector 31 is intended to be connected to a hose allowing for the expulsion of purge gas (alternatively the connector can be left free so that the purge gas is expelled into the pipeline). The connector 32 is intended to be connected to a hose delivering pressurised fluid for driving the second set of clamping members 14 towards their retracted condition. The connector 33 is intended to be connected to a hose delivering fluid into the sealing bladder 42. The connector 34 is intended to be connected to a hose delivering fluid for driving the first set of clamping members 12 towards their retracted condition. The connector 35 is intended to be connected to a hose delivering fluid for driving the set of back-up shoes towards their extended condition. The connector 36 is intended to be connected to a hose delivering purge gas such as argon in the region around the clamp and adjacent the weld site. The connector 37 is intended to be connected to a hose delivering pressurised fluid for driving the second set of clamping members 14 towards their extended condition. The connector 38 is intended to be connected to a hose delivering fluid into the sealing bladder 44. The connector 39 is intended to be connected to a hose delivering fluid for driving the set of back-up shoes 16 towards their retracted condition. The connector 40 is intended to be connected to a hose delivering pressurised fluid for driving the second set of clamping members 14 towards their extended condition.

Thus, in the embodiment shown the clamp has facility for introducing a purge gas around the weld site; it will be understood that this is a requirement for the welding of certain materials, for example stainless steel. To achieve this, the bladders 42 and 44 are first expanded into engagement with the inside surface 22 of the pipeline, sealing a volume of air around the body 20 of the clamp. An inert purge gas such as argon is introduced into this volume, which purge gas expels air from this volume through the bleed hole 46 and into the hose (if any) connected to connector 31. When all or substantially all of the air has been expelled from the volume the welding can take place. (It will be understood that a similar inert atmosphere is provided around the outside of the pipeline, adjacent the weld site).

When the clamp is to be used for welding a material which does not require an inert atmosphere, connectors 31, 33, 36 and 38 can be left unconnected.

FIGS. 3–11 show cross-sections of the clamp at various positions along its length, to show the arrangement of the conduits and passageways within the body 20 that are provided to deliver the pressurised fluid from the hose connected to each connector 31–40 to the site within the body at which it is required. For ease of understanding, the conduit connected to connector 31 is referred to by the numeral "11" in these figures, and so on, so that the conduit connected to connector 40 is referred to by the numeral "10" in these figures.

It will be seen from FIGS. 1 and 2 that all of the connectors 31–40 (and thus all of the conduits 1–10) are arranged at a common radius r.

Figure 3:
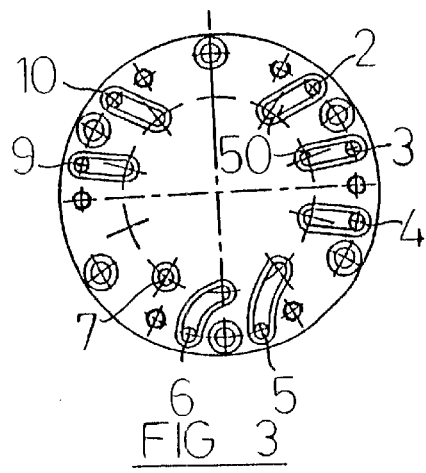
FIG. 3 shows a cross-section of the clamp along the plane III of FIG. 1.

As shown in FIG. 3, the conduits 2,3,4,5,6,9 and 10 communicate with respective passageways 50, each of which is radial (or has a radial component) allowing the transmission of fluid from the radius r to the (increased) radius R. Of the remaining conduits, conduit 1 is connected to the bleed opening 46 (FIG. 1), conduit 8 is connected to the bladder 44 (the detail of this connection is not seen in the drawings), and conduit 7 delivers fluid into chamber 52 behind piston 54.

The introduction of fluid into chamber 52 behind piston 54 drives piston 54 to the left as drawn (from the position shown at the bottom half of each part of FIG. 1 towards the position shown in the top half of each part of FIG. 1). Movement of the piston 54 to the left causes the toggle mechanism 56 to drive the clamping members 24 to their extended conditions.

Figure 4:
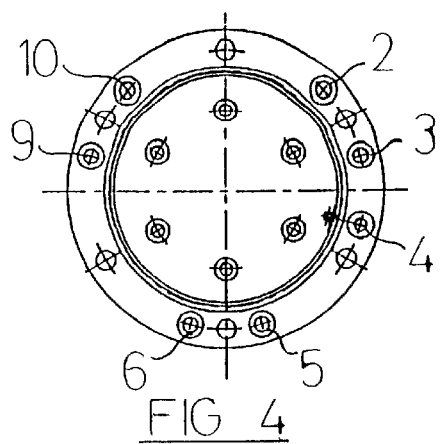
FIG. 4 shows a cross-section of the clamp along the plane IV of FIG. 1.

FIG. 4 shows that the conduits 2,3,4,5,6,9, and 10 remain at radius R as they pass around the outside of the chamber 52.

Figure 5:
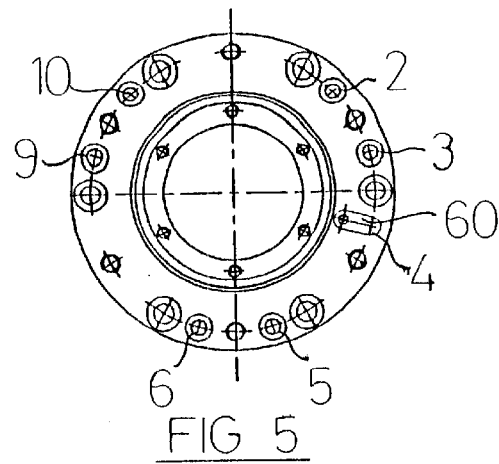
FIG. 5 shows a cross-section of the clamp along the plane V of FIG. 1.
Figure 14:
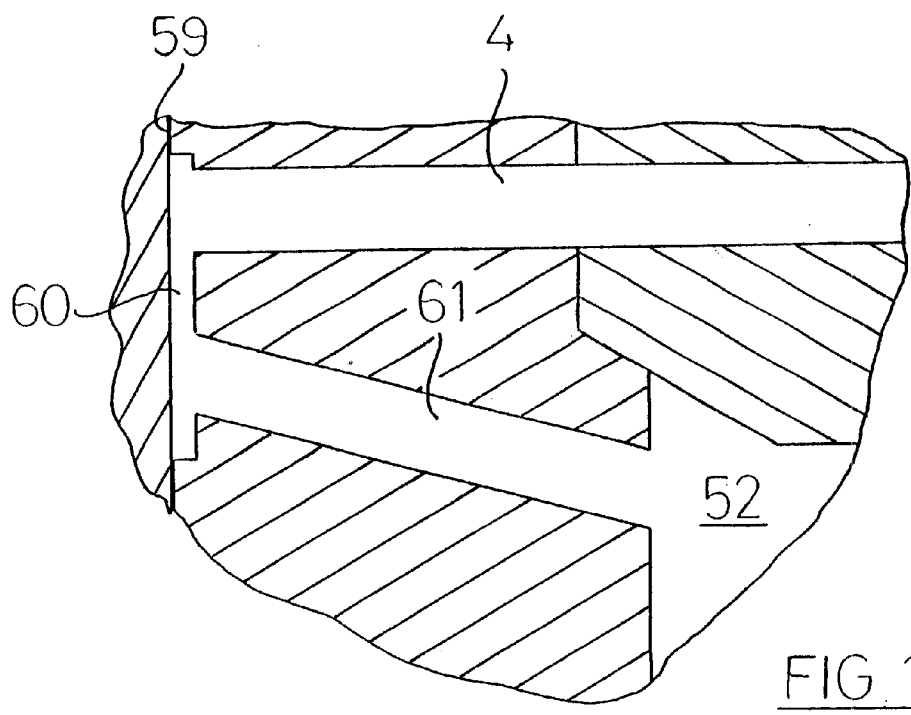
FIG. 14 is an enlarged sectional view of a part of FIG. 1 within the circle XIV.

FIG. 5 shows that the conduits 2,3,5,6,9 and 10 remain at radius R, whilst conduit 4 communicates with passageway 60 (see also FIG. 14) which in turn communicates with angled conduit 61 (FIG. 14) and the chamber 52 in front of piston 54, the introduction of fluid in front of piston 54 driving the toggle mechanism 56 to retract the first set of clamping members 12. Thus, as better seen in FIG. 14, each passageway (such as passageway 60) is a recess or depression formed in the otherwise flat surface (such as surface 59) of the respective body section, the passageway permitting fluid to flow therethrough, between the conduits which are connected to each end of the passageway.

Figure 6:
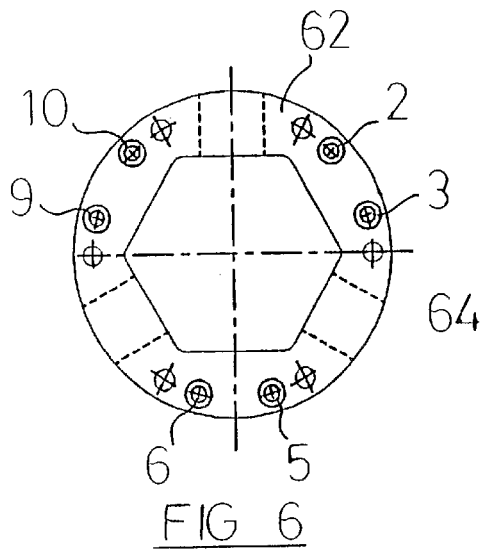
FIG. 6 shows a cross-section of the clamp along the plane VI of FIG. 1.
Figure 7:
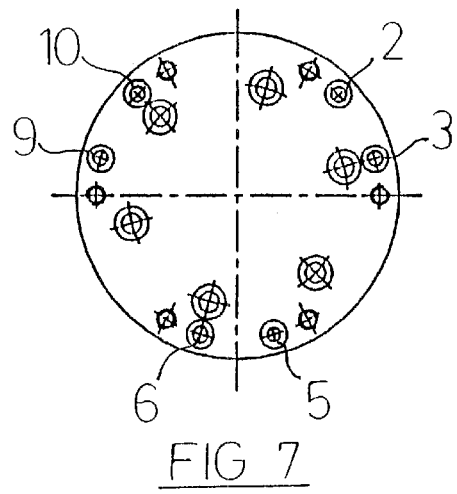
FIG. 7 shows a cross-section of the clamp along the plane VII of FIG. 1.

FIGS. 6 and 7 show that the conduits 2,3,5,6,9 and 10 all remain at radius R, and pass around and between the toggle mechanism 56. FIG. 6 shows the internal hexagonal form of the section 62; FIG. 6 also shows the three openings 64 into which the respective clamping members 24 are mounted (see also FIG. 12).

Figure 8:
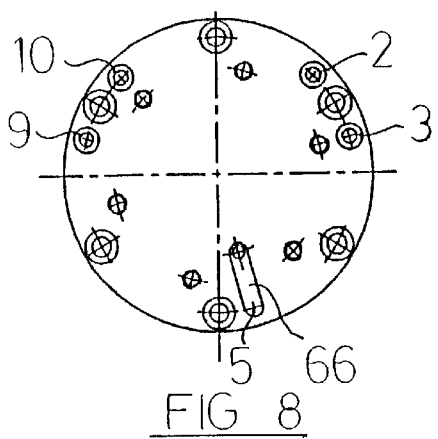
FIG. 8 shows a cross-section of the clamp along the plane VIII of FIG. 1.

FIG. 8 shows that the conduits 2,3,9 and 10 all remain at radius R. Conduit 5 is connected to passageway 66 which in turn communicates with chamber 70 behind piston 72. Conduit 6 passes to the outside of the body (between sections VII—VII and VIII—VIII) so as to deliver purge gas into the volume around the body 20 between the bladders 42,44.

The introduction of fluid into chamber 70 behind piston 72 drives piston 72 to the left as drawn (from the position shown at the bottom half of each part of of FIG. 1 towards the position shown in the top half of each part of FIG. 1). Movement of the piston 72 to the left causes the toggle mechanism 74 to drive the back-up shoes 26 to their extended conditions.

Figure 9:
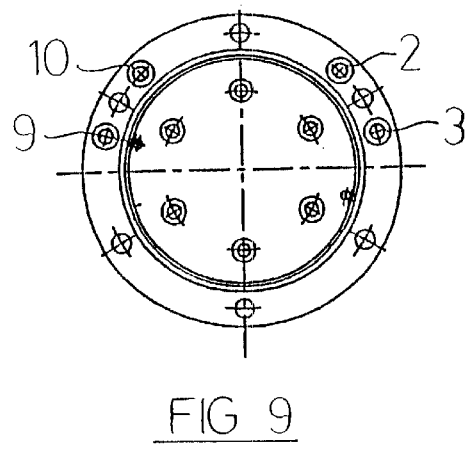
FIG. 9 shows a cross-section of the clamp along the plane IX of FIG. 1.

FIG. 9 shows conduits 2,3,9 and 10 remain at radius R, having passed around chamber 70.

Figure 10:
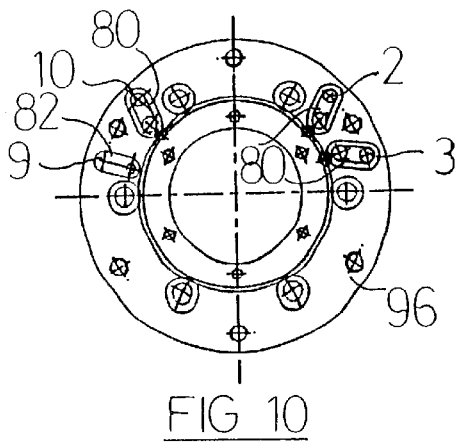
FIG. 10 shows a cross-section of the clamp along the plane X of FIG. 1.

FIG. 10 shows conduits 2,3, and 10 connected to respective passageways 80, and conduit 9 connected to passageway 82. Each passageway 80,82 communicates its respective conduit from radius R to radius r. The passageway 82 also communicates with the chamber 70 in front of the piston 72 (by way of an angled conduit similar to that shown in FIG. 14), the introduction of fluid into chamber 70 in front of piston 72 driving piston 72 to the right as drawn to drive the back-up shoes 26 to their retracted conditions.

Figure 11:
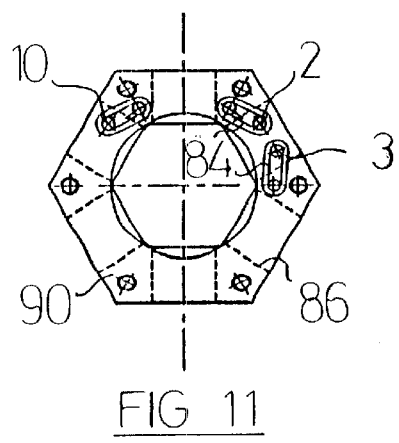
FIG. 11 shows a cross-section of the clamp along the plane XI of FIG. 1.

FIG. 11 shows that conduits 2,3, and 10 are connected to respective passageways 84. Passageways 84 alter the radius of these conduits and also move them axially so that the conduits can pass the six openings 86 provided in the body portion 90, each of which openings provides a guide channel for one of the six back-up shoes 26 (see also FIG. 13).

To the left of the back-up shoes 26 the remaining conduits 2,3 and 10 once again return to radius r and subsequently to radius R, by way of a body portions 92 and 94 which are the mirror images of body portion 90 and 96 respectively. These conduits all continue at radius R until plane A, which is similar to the plane shown in FIG. 5 except that conduit 2 communicates with a passageway which in turn communicates with chamber 100 in front of piston 102.

The introduction of fluid into chamber 100 in front of piston 102 drives piston 102 to the left as drawn (from the position shown at the top half of the parts of FIG. 1 towards the position shown in the bottom half of the parts of FIG. 1). Movement of the piston 102 to the left causes the toggle mechanism 104 to drive the clamping members 24 to their retracted conditions.

Conduits 3 and 10 continue at radius R past chamber 100; at plane B (which is similar to the plane shown in FIG. 3) conduit 10 communicates with a passageway which (by way of an angled conduit similar to that of FIG. 14) communicates with the chamber 100 behind piston 102. The introduction of fluid into chamber 100 behind piston 102 drives piston 102 to the right as drawn to drive the clamping members 24 of set 14 to their extended conditions.

The conduit 3 contines beyond plane B and communicates with the bladder 42.

It will be seen that the body 20 is made up of a number of sections (such as sections 62,90,92,94,96) which have passageways and conduits therein for communicating pressurised fluid through the body of the clamp. The sections also have bolt holes (such as bolt holes 98 shown in FIG. 5) by which the sections may be secured together into an assembled clamp body 20. It is arranged that the clamp body 20 is constructed from the various secions from one end, each time an additional body section is added to the part-assembled body it is secured thereto, the body therefore being built up in modular fashion.

It is another feature of the invention that the clamp body 20 has a bore running through it. Thus, as will be seen from FIG. 1, each of the pistons 54, 72 and 102 has a through-bore, and the centre of the body 20 within which the pistons are located is open between each of the pistons, and open to both of its respective ends. Accordingly, the clamp body 20 permits an equalisation of pressure between its two ends, which equalisation reduces the likelihood, or prevents, the clamp body being moved forcibly along the pipeline by pressure differentials within the pipeline. It will be understood that such pressure differentials will only be a concern when the clamp is operating, i.e. its clamping members 24, back-up shoes 26 and bladders 42,44 are extended, but during this time any movement of the clamp along the pipeline could cause serious problems, particularly if the back-up shoes are moved out of alignment with the weld site.

Figure 12:
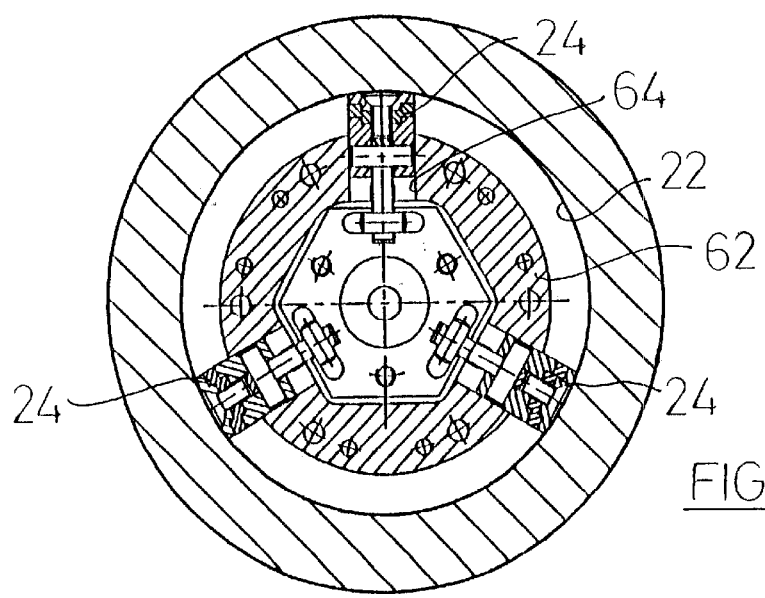
FIG. 12 shows a cross-sectional view through a set of clamping members, the clamping members being in their extended condition.
Figure 13:
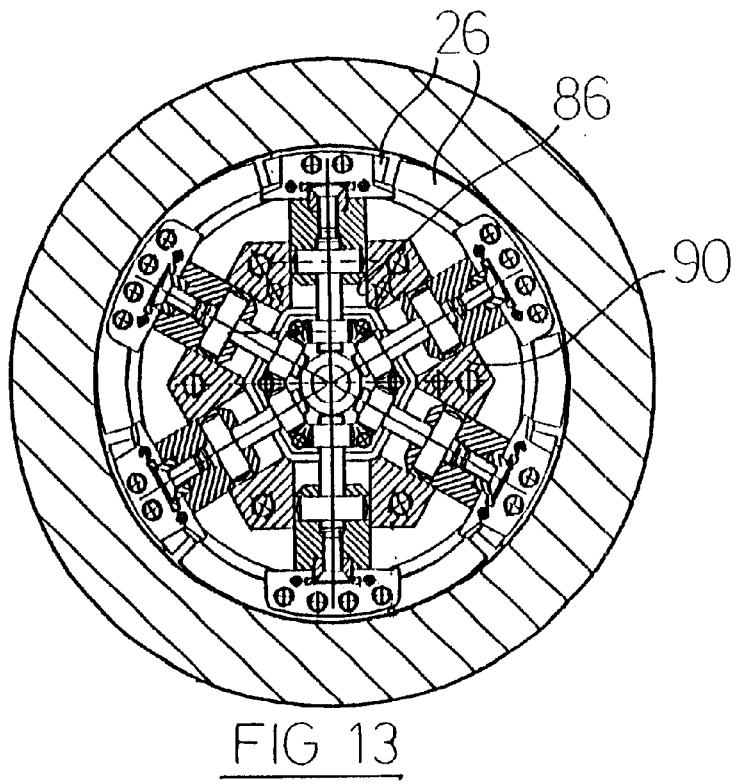
FIG. 13 shows a cross-sectional view through the set of back-up shoes, the back-up shoes being in their extended condition.

As indicated above, the form of the clamping members 24 and the back-up shoes 26 is outside the scope of this invention, and these components could be of any suitable form. However, as shown in FIG. 12 there are three clamping members 24 in each set, each clamping member comprising a block so that the inside surface 22 of the pipeline is clamped at three spaced locations around its circumference. Each clamping member has an arcuate surface matching the curvature of the inside surface 22.

In addition, the six back-up shoes 26 are preferably of isosceles trapezium shape (as in GB 2,067,945 and WO95/21721) or perhaps triangular shape, with adjacent shoes facing and being biassed in opposed directions so that as the shoes are pushed outwards by the toggle mechanism 76 the sides of each shoe slide relative to its neighbours and each shoe remains in contact with its neighbours at all times, regardless of the extended or retracted position of the shoes.

What is claimed is:

1. A backup clamp having a rigid clamp body, at least one set of clamping members mounted upon the clamp body, a set of back-up shoes mounted upon the clamp body, the set of clamping members and the set of back-up shoes being movable relative to the body, movement of the set of clamping members and the set of back-up shoes being controlled by fluid pressure applied to at least one location of the clamp, the clamp having a number of conduits adapted to deliver pressurized fluid to the location(s), wherein each conduit has a length and the complete length of each conduit is located within the body.

2. A back-up clamp according to claim 1 wherein the clamp has an end face, and wherein a number of connectors are mounted upon the end face, each conduit being open to a respective connector.

3. A back-up clamp according to claim 2 having two or more connectors, wherein all of the connectors are identical, and wherein each connector is adapted to cooperate with a connecting part on the end of a pressurised fluid hose.

4. A back-up clamp according to claim 1 wherein the clamp has two sets of clamping members, one located to either side of the set of back-up shoes.

5. A back-up clamp according to claim 1 wherein the clamp has opposed ends, and wherein a through-bore is provided between the opposed ends.

6. A back-up clamp according to claim 5 wherein the through-bore is centrally located within the body.

7. A back-up clamp according to claim 1 wherein the clamp body is formed from separable sections, at least one of the sections having at least one conduit formed therethrough to permit the passage of pressurised fluid to the adjacent section.

8. A back-up clamp according to claim 7 wherein said at least one conduit is substantially aligned with the longitudinal axis of the clamp.

9. A back-up clamp according to claim 7 wherein at least one of the sections has a passageway which can communicate fluid pressure from one radial position to a different radial position.

10. A back-up clamp having a rigid clamp body, at least one set of clamping members mounted upon the clamp body, a set of back-up shoes mounted upon the clamp body, the set of clamping members and the set of back-up shoes being movable relative to the body, movement of the set of clamping members and the set of back-up shoes being controlled by fluid pressure applied to at least one location of the clamp, the clamp having a number of conduits adapted to deliver pressurized fluid to the location(s), wherein the clamp includes a pair of flexible bladder means adapted to engage the inside of the pipeline and to provide an air-tight seal therewith, the clamp having at least one further conduit adapted to deliver pressurized fluid to each of the bladder means, the complete length of each conduit being located within the body.

11. A back-up clamp according to claim 10 wherein the clamp has an additional conduit adapted to deliver an inert gas to the outside of the clamp between the respective bladder means.

12. A back-up clamp having a rigid clamp body, at least one set of clamping members mounted upon the clamp body, a set of back-up shoes mounted upon the clamp body, the set of clamping members and the set of back-up shoes being movable relative to the body, wherein the clamping members and the back-up shoes are independently actuated, movement of the set of clamping members being controlled by fluid pressure applied to a first location of the clamp and movement of the set of back-up shoes being controlled by fluid pressure applied to a second location of the clamp, the clamp having a first conduit adapted to deliver pressurized fluid to the first location and a second conduit adapted to deliver pressurized fluid to the second location, the complete length of each of the first conduit and the second conduit being located within the body.

13. A back-up clamp according to claim 12 wherein the set of clamping members is a first set of clamping members, and a second set of clamping members is also provided, movement of the second set of clamping members being controlled by fluid pressure applied to a third location of the clamp, the clamp having a third conduit adapted to deliver pressurised fluid to the third location.

14. A back-up clamp according to claim 12 wherein movement of the set of clamping members and the set of back-up shoes is effected by respective piston and cylinder arrangements.

15. A back-up clamp according to claim 14 wherein each piston and cylinder arrangement actuates the respective clamping members or back-up shoes by way of a respective toggle mechanism, the piston of each piston and cylinder arrangement being adapted to move longitudinally relative to the clamp, the toggle mechanism converting the longitudinal movement into radial movement.

\* \* \* \* \*